United States Patent Office 3,574,062
Patented Apr. 6, 1971

3,574,062
METHOD OF IMMOBILIZING ENZYMES AND PRODUCT
Takuya R. Sato, Pasadena, Calif., assignor to Beckman Instruments, Inc., Fullerton, Calif.
No Drawing. Filed Apr. 20, 1967, Ser. No. 632,169
Int. Cl. C07g 7/02; C08h 1/00, 7/00
U.S. Cl. 195—63                                       6 Claims

ABSTRACT OF THE DISCLOSURE

A method of immobilizing enzymes by reacting an enzyme with a diazo-protein substrate such as diazo-protein polyurethane. The substrate may be prepared by diazotizing a polyester polyurethane and coupling a protein to the diazotized polyurethane. The immobilized enzyme may be used as a catalyst in analytical procedures and the substrate is preferably a reticulated structure.

BACKGROUND OF THE INVENTION

The present invention relates to a method for immobilizing enzymes and to the product thereof. More particularly, the present invention relates to a method whereby enzymes are immobilized on porous or reticulated organic substrates by means of bridging or coupling constituents and to the product thereof.

The use of enzymatic reactions in chemical analyses has become increasingly important in recent years, particularly with regard to the analysis of biochemical substances such as blood and other body fluids. This analytical method makes possible the analysis of body fluids in very short response times which is often of great importance, as when treatment of a patient depends upon the results of an analysis of one or more of the patient's body fluids. One example of such an analytical method is disclosed in copending Kadish et al. application Ser. No. 414,685, filed Nov. 30, 1964, assigned to the assignee of the present invention, the disclosure of which is incorporated by reference herein. As disclosed in application Ser. No. 414,685, enzymes such as glucose oxidase and catalase may be used as catalysts in analytical procedures such as monitoring blood for glucose content according to the following reaction:

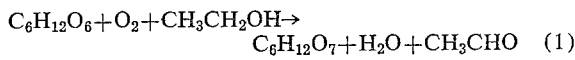

$$C_6H_{12}O_6 + O_2 + CH_3CH_2OH \rightarrow C_6H_{12}O_7 + H_2O + CH_3CHO \quad (1)$$

The amount of glucose in a given blood sample is determined by measuring, e.g., with a polarographic sensor, the amount of oxygen present in the reagent prior to addition of the blood and subsequent to completion of the reaction defined by Equation 1 since the amount of oxygen consumed will establish the amount of glucose available to react with the oxygen to form gluconic acid. This reaction takes place in a flow chamber in which blood, enzymes and solvent are combined. Since the enzymes do not take part in the reaction, they may be separated from the reaction product and reused.

Although the foregoing analytical method is highly satisfactory from the standpoint of the analytical results which are obtained, it suffers from dependence upon the use of "free" enzymes, i.e., enzymes which dissolve in the reaction system since storage of such enzymes is extremely difficult and because relatively cumbersome systems are required to provide adequate reaction chambers. In addition, a certain amount enzyme is inevitably lost when the enzyme reagent is separated from the reaction product for recycling to the reaction system. All of these problems are compounded by the high cost of enzymes.

Thus, it is a primary object of the present invention to provide a method whereby enzymes may be immobilized in such a manner that they may be used in analytical techniques and to provide the immobilized enzyme product.

It is a further object of the present invention to provide a method for immobilizing enzymes on a porous or reticulated substrate and the product thereof.

It is a still further object of the present invention to provide a method for immobilizing enzymes on substrates whereby bridging or coupling constituents function to hold the enzyme on the substrate, and the product thereof.

Another object of the present invention is to provide a method for immobilizing enzymes on polyurethane substrates by means of coupling an intermediate protein layer to a polyethylene substrate by means of a diazotization procedure and to couple the enzyme to the protein layer whereby the enzyme is immobilized and to provide immobilized enzyme product.

Other objects and advantages, it is believed will be readily apparent from the following detailed disclosure of specific embodiments thereof.

Broadly, the present invention comprises a method according to which a substrate capable of being diazotized such as polyester polyurethanes is diazotized following which a protein is coupled to the diazotized substrate and the enzyme immobilized by coupling to the protein-modified diazotized substrate.

For use in an analytical procedures, it is preferred that the substrate permit a high flow of liquid such as aqueous solutions therethrough and for this reason polyurethane foams have been found particularly suitable as substrates. Such immobilized enzymes have particular utility in biochemical analysis of the type described above. When immobilized enzymes produced according to the present invention are used, there is a saving in the amount of enzyme required, a saving enhanced by the long periods during which such immobilized enzymes remain active; a substantial reduction in the size, weight and complexity of the analytical system since the enzyme solution reservoir, separation equipment and recycling equipment are eliminated, and since enzymes having higher specific activities can be made available, reaction times are shortened. For example, when the immobilization method of the present invention is employed, glucose oxidase and catalase have been shown to maintain their activities for at least as long as forty-eight hours.

It is to be understood that immobilized enzymes may be used in analytical systems other than that specifically described above, e.g., such immobilized enzymes may be used to measure rates of reaction such as the reactions which occur at electrodes in electrochemical reactions. Still further, the immobilized enzymes of the present invention provide a highly advantageous vehicle for study of the immobilized enzyme itself.

The present invention is further illustrated by the following examples:

EXAMPLE I

A disk of polyester polyurethane foam having a thickness of one-eighth inch was washed with acetone to remove fatty substances. The disk was then washed with distilled water to remove residual acetone. Reticulation, i.e., removal of the membranes to leave a skeletal structure, was accomplished by treatment with 0.5 normal sodium hydroxide at 60° C. for five to ten minutes, followed by rinsing with distilled water.

The reticulated polyurethane was then subjected to a diazotization procedure. Four milliliters (three moles) of sodium nitrite was added drop-wise to an ice-cold solution of one gram of p-amino hippuric acid in fifteen ml. of three normal hydrochloric acid until the solution gave a positive test to starch-iodine paper. The temperature was maintained near 0° C. by use of an ice-salt water bath. The diazonium salt solution was adjusted to pH 7.0 with sodium hydroxide. The diazonium salt solution was then immediately added to the reticulated polyurethane disk which was squeezed to allow the solution to be imbibed by the polyurethane. After twelve hours the polyurethane diazo hippurated disk was thoroughly washed and stored under distilled water.

Crystallized bovine serum albumin was then coupled to the polyurethane diazo hippurate in the presence of N,N'-dicyclohexyl carbodiimide. The disk was added to a twenty-five ml. solution at 0° C. of borate buffer (pH 8.5) which contained 0.5 gram of crystallized bovine serum albumin. A ten ml. solution (at 0° C.) of tetrahydrofuran containing 0.5 gram of N,N'-dicyclohexyl carbodiimide (hereinafter referred to as DCC) was then added to the disk soaked with serum albumin. The disk was then squeezed several times in the DCC-containing solution to insure permeation of the disks with the albumin.

The disk was stirred in a beaker with the above mixture for twenty-four hours at 5° C. and then pressed in a Buechner funnel to remove the solution after which it was exhaustively washed with a mixture of tetrahydrofuran and water.

A ten ml. solution (at 0° C.) of borate buffer (pH 8.5) containing purified glucose oxidase (enzymatic activity of twenty-five thousand units) and catalase (three thousand to five thousand Katf units) was used to saturate the serum albumin-polyurethane diazo hippurate disk. A solution of DCC (one gram in ten ml. tetrahydrofuran) at about 0° C. was added with squeezing of the disk to distribute the resultant solution throughout the disk.

The disk was then vigorously shaken in a vial with the enzyme mixture for forty-eight hours at 5° C. After shaking, the mixture was stirred for sixteen hours to hydrolyze any unreacted DCC. After filtering in a Buechner funnel, the disk was washed extensively on the filter with a mixture of tetrahydrofuran and water to dissolve any unreacted DCC and some of the dicyclohexylurea which results from hydrolysis of the DCC. After washing, the disk was suspended in a dilute sodium bicarbonate solution and separated from the solvent by filtration. This was followed by washing with distilled water until glucose oxidase FAD is not detected.

The same procedure was used with other polyester polyurethane disks with the exception that p-amino phenyl acetic acid, p-amino-4-phenyl butyric acid and p-amino benzoic acid were each substituted for p-amino hippuric acid.

EXAMPLE II

The products of Example I were tested for enzymatic activity and were compared with products produced by other methods. It was found that the product prepared according to Example I using p-amino hippuric acid had an initial glucose oxidase activity of 1120 units and activities of 920 and 760 units after 24 and 48 hours, respectively. A product prepared in the same manner except that the use of serum albumin was omitted had an initial activity of 51 units and no activity after 24 and 48 hours while a product using albumin but omitting diazotization had an initial activity of 170 and no activity after 24 and 48 hours. A product prepared by reacting glucose oxidase with the polyurethane disk had an initial activity of 34 units and no activity after 24 and 48 hours.

Similarly, the product of the present invention in which p-amino phenylacetic acid was used in diazotization had an initial activity of 905 units and activities of 751 and 624 units after 24 and 48 hours respectively while the same product prepared without use of a protein had an initial activity of .45 unit and no activity after 24 or 48 hours.

In like manner, the product of the present invention in which diazotization was accomplished with p-amino-4-phenyl butyric acid had an initial activity of 952 units and activities of 790 and 656 units after 24 and 48 hours respectively whereas the same product produced without protein had an initial activity of 42 units and no activity after 24 or 48 hours.

Still further, a product of the present invention diazotized by use of p-amino benzoic acid had an initial activity of 810 units and activities of 672 and 558 units after 24 and 48 hours respectively while the same product prepared without protein had an initial activity of 39 units and no activity after 24 or 48 hours.

In all of the foregoing cases, the product of the present invention was produced using bovine serum albumin and the polyester polyurethane was the reaction product of a hydroxyl terminated polyester resin condensed from adipic acid, diethylene glycol and trimethol propane with toluene diisocyanate and water.

In the practice of the present invention, any diazotizing compound which has reactive groups available for reaction with the protein used may be employed. Preferably, the diazotizing compound contains a carboxyl group and further examples of such compounds are p-amino phenoxyacetic acid and p-amino phenylalanine. While the present invention is not to be confined to any particular theory, it is believed that the diazonium substituent provides a bridge between the substrate and the protein. The protein is believed to provide a large number of reactive sites, primarily carboxyl and amino groups, for reaction with the enzyme or enzymes which are immobilized. Among the proteins which have been found suitable are human serum albumin, ovalbumin, bovine collagen and casein, but it is to be understood that the same proteins from other sources and other proteins having reactive sites for the enzyme to be immobilized may be used.

Having fully described the present invention, it is to be understood that it is not to be limited to the details herein set forth, but is of the full scope of the appended claims.

What is claimed is:

1. A method of immobilizing enzymes comprising the steps of diazotizing a polyester polyurethane with a diazonium salt of an acid selected from the group consisting of p-amino hippuric acid, p-amino phenyl acetic acid, p-amino-4-phenyl butyric acid, p-amino phenoxy acetic acid, p-amino phenylalanine, and p-amino benzoic acid, coupling a nonenzymatic animal protein to the resulting diazotized polyurethane and reacting an enzyme selected from the group consisting of catalase, glucose oxidase, and mixtures thereof with the resulting protein-diazotized polyurethane to immobilize said enzyme.

2. An immobilized enzyme product produced according to the process of claim 1.

3. The method of claim 1 wherein said protein is selected from the group consisting of serum albumin, ovalbumin, collagen and casein.

4. An immobilized enzyme product produced according to the process of claim 3.

5. A method of immobilizing enzymes comprising diazotizing a diazotizable substrate, coupling a non-enzymatic protein thereto to form a protein-diazotized substrate, said protein being selected from the group consisting of serum albumin, ovalbumin, collagen, and casein, and reacting an enzyme with said protein-diazotized substrate to immobilize said enzyme.

6. An immobilized enzyme product produced according to the process of claim 5.

References Cited

Grubhofer et al.: Naturwissenschaften, vol. 40, p. 508 (1953).

Silman et al.: Biopolymers, vol. 4, pp. 441–448 (1966).

LIONEL M. SHAPIRO, Primary Examiner

U.S. Cl. X.R.

195—68; 260—121